(12) United States Patent
Talavera

(10) Patent No.: US 6,209,214 B1
(45) Date of Patent: Apr. 3, 2001

(54) COMBINATION TEMPLATE/LEVEL FOR INSTALLING UTILITY BOXES

(76) Inventor: George Talavera, 424 W. 110$^{th}$ St., Apartment 15E, New York, NY (US) 10025

(*) Notice: Subject to any disclaimer, the term of this patent is extended or adjusted under 35 U.S.C. 154(b) by 0 days.

(21) Appl. No.: 09/240,105

(22) Filed: Jan. 29, 1999

Related U.S. Application Data

(60) Provisional application No. 60/073,130, filed on Jan. 30, 1998.

(51) Int. Cl.$^7$ .................................................. G01C 9/26
(52) U.S. Cl. ........................................ 33/528; 33/DIG. 10
(58) Field of Search ........................... 33/370, 365, 381, 33/528, DIG. 10

(56) References Cited

U.S. PATENT DOCUMENTS

| | | | |
|---|---|---|---|
| 2,733,513 | * | 2/1956 | Gatineau .......................... 33/DIG. 10 |
| 4,793,069 | * | 12/1988 | McDowell ...................... 33/DIG. 10 |
| 4,888,880 | * | 12/1989 | Parker ..................................... 33/528 |
| 5,136,788 | * | 8/1992 | Jackson .......................... 33/DIG. 10 |
| 5,222,303 | * | 6/1993 | Jardine ........................... 33/DIG. 10 |
| 5,813,130 | * | 9/1998 | MacDowell .................... 33/DIG. 10 |

* cited by examiner

Primary Examiner—G. Bradley Bennett
(74) Attorney, Agent, or Firm—Adams, Schwartz & Evans, P.A.

(57) ABSTRACT

A template for permitting accurate and level marking of the shape of a wall opening for placement therein of utility boxes. The template comprises a base having a periphery shaped to match the shape of the periphery of a utility box to be fitted into the wall opening the base including opposed first and second surfaces. The first surface is adapted for being engaged with the wall to be marked. At least one spirit level cooperates with the base for permitting a user to level the template before marking the shape of the wall opening on the wall prior to forming the opening.

11 Claims, 5 Drawing Sheets

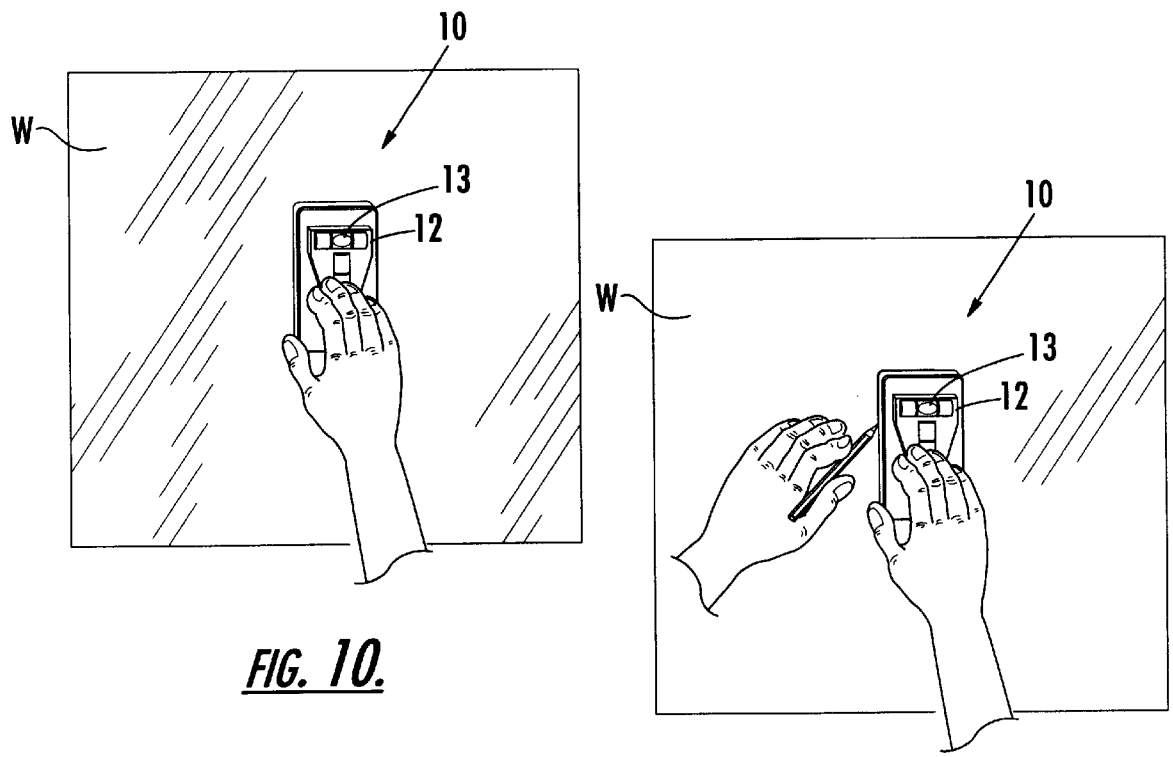
FIG. 10.
FIG. 11.
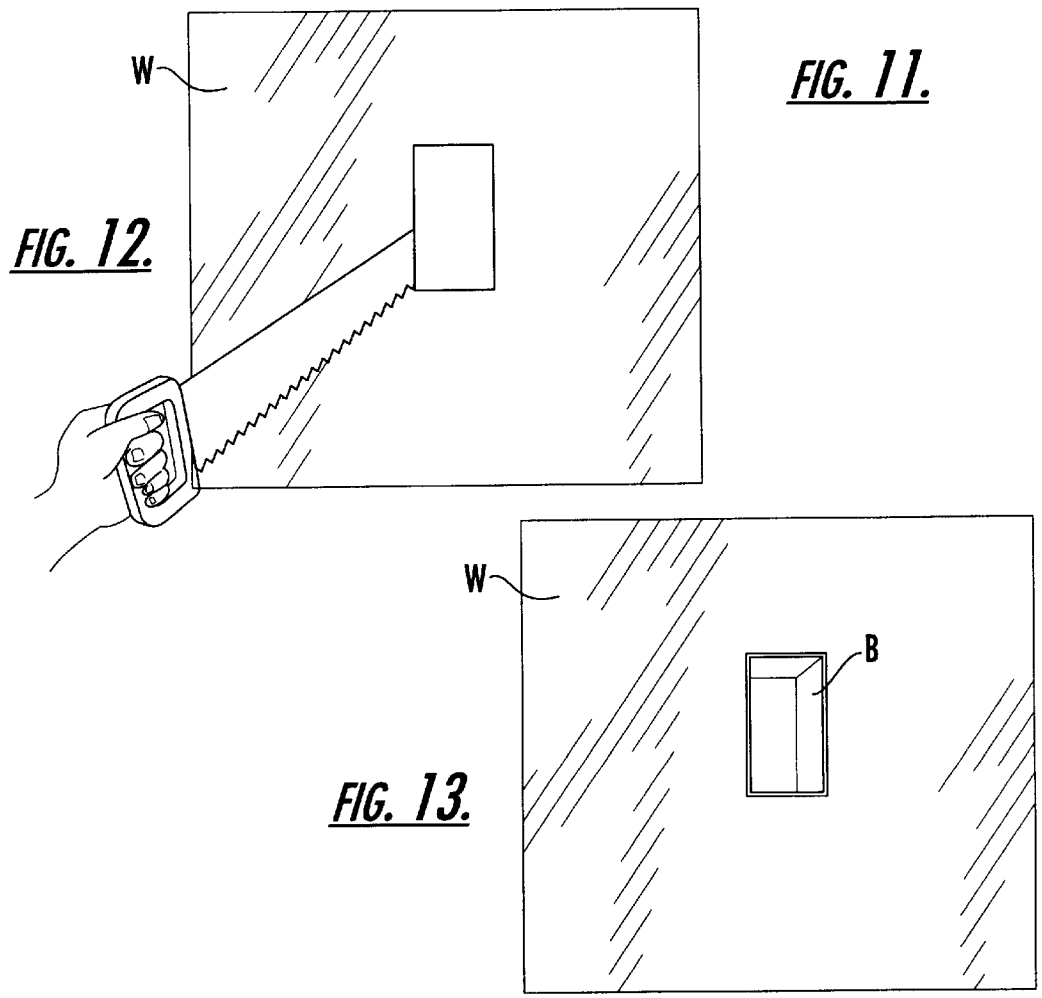
FIG. 12.
FIG. 13.

COMBINATION TEMPLATE/LEVEL FOR INSTALLING UTILITY BOXES

TECHNICAL FIELD AND BACKGROUND OF THE INVENTION

This application claims priority based on Provision application Ser. No. 60/073,130, filed Jan. 30, 1998.

This invention relates to a device for assisting an installer in properly installing utility boxes in a wall, such as drywall, floor, ceiling or door, and that the utility box is level. By "utility box" is meant any device intended to be snugly fitted into a opening in a wall. Therefore, electrical service boxes such as outlets and switches, cable television and telephone connections, plumbing fixtures such as modular clothes washer water connections, mail slots, lighting fixtures such as recessed lighting cans are among the types of utility boxes which can be installed with the device disclosed in this application.

The invention has particular application to the installation of utility boxes in existing walls, where an opening is formed in the wall and the utility box fitted into the newly-formed opening. Present techniques for making sure the opening is level include holding the utility box to be installed against the wall and tracing around the box with a pen or pencil while holding a carpenter's level on top of the box. This is difficult to do, since the top edge of some utility boxes are not regularly shaped and the level interferes with the tracing. In many cases, the installer merely "eyeballs" the correct position, resulting in irregularly-positioned utility boxes.

It has also been found that by carefully tracing around a template of the utility box which has all of the peripheral structural features of the box, the box can be easily and quickly positioned with a high degree of accuracy. The box fits snugly into the opening so that there is no tendency for the box to rotate in the opening into an out-of-level position.

Of course, the templates according to the invention can also be used for marking the location of utility box openings on drywall which has not yet been installed, once the correct location of the opening has been determined.

SUMMARY OF THE INVENTION

Therefore, it is an object of the invention to provide a utility box template which includes a level for insuring that the opening for the utility box is level, and that the utility box, when installed in the opening, is level.

It is another object of the invention to provide a utility box template which is compact and easy to use.

It is another object of the invention to provide a utility box template which has a shape which includes the exact peripheral shape of utility box to be installed in the utility box opening.

It is another object of the invention to provide a utility box template which will provide the shape of an opening into which the utility box will snugly fit.

It is another object of the invention to provide a utility box template which is transparent so that the user can keep sight of surface markings.

These and other objects of the present invention are achieved in the preferred embodiments disclosed below by providing a template for permitting accurate and level marking of the shape of a wall opening for placement therein of utility boxes. The template comprises a base having a periphery shaped to match the shape of the periphery of a utility box to be fitted into the wall opening. The base includes opposed first and second surfaces. The first surface is adapted for being engaged with the wall to be marked. At least one spirit level cooperates with the base for permitting a user to level the template before marking the shape of the wall opening on the wall prior to forming the opening.

According to one preferred embodiment of the invention, the spirit level is mounted on the second surface of the base.

According to another preferred embodiment of the invention, the base is transparent.

According to yet another preferred embodiment of the invention, the spirit level extends outwardly from the second surface of the base and forms a hand-hold.

According to yet another preferred embodiment of the invention, the spirit level is embedded in the base.

Preferably, first and second spirit levels cooperate with the base. The first and second spirit levels are positioned at right angles to each other for permitting use of a predetermined one of the first or second spirit levels dependent on the orientation of the opening to be formed for the utility box.

According to yet another preferred embodiment of the invention, the first and second spirit levels are secured to the second surface of the base.

According to yet another preferred embodiment of the invention, the gripping means is positioned on the first surface of the base for aiding in maintaining the base in a stationary position during marking of the wall.

According to yet another preferred embodiment of the invention, the gripping means comprises rubber.

According to yet another preferred embodiment of the invention, the gripping means comprises a plurality of pins extending outwardly from the first surface of the base for penetrating the wall.

According to yet another preferred embodiment of the invention, a template is provided for permitting accurate and level marking of the shape of a wall opening for placement therein of utility boxes. The template comprises a base having a periphery shaped to match the shape of the periphery of a utility box to be fitted into the wall opening the base. The base includes opposed first and second surfaces. The first surface is adapted for being engaged with the wall to be marked. First and second spirit levels are carried at right angles to each other on the base for permitting a user to level the template before marking the shape of the wall opening on the wall prior to forming the opening.

According to yet another preferred embodiment of the invention, the base is formed of transparent acrylic material, and the base is approximately one-quarter inch thick.

According to yet another preferred embodiment of the invention, first and second spirit levels are protectively embedded in the acrylic material.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 10–13 are sequential views showing the manner of use of the template.

DESCRIPTION OF THE PREFERRED EMBODIMENT AND BEST MODE

Figure 1:
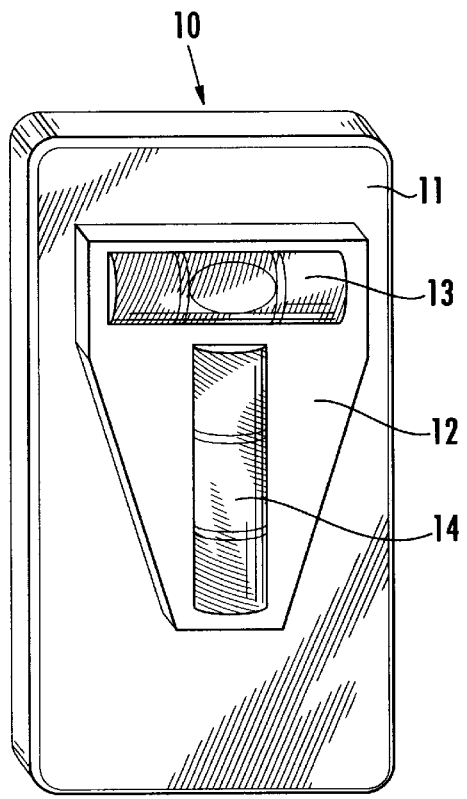
FIGS. 1–6 are perspective views of template/levels shaped according to the invention.
Figure 2:
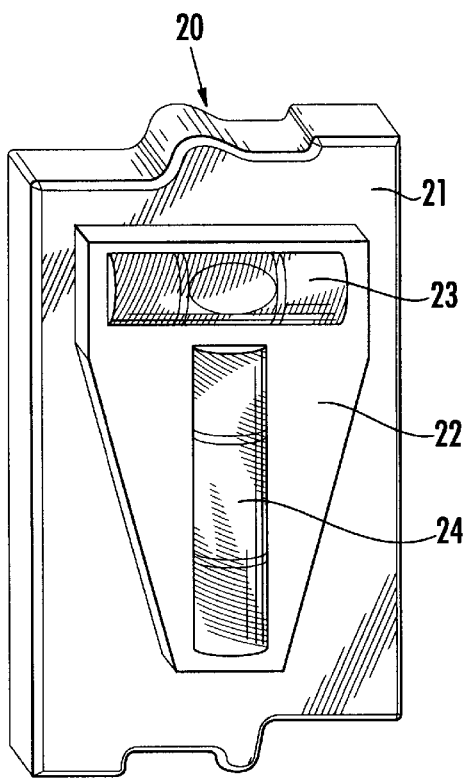
Figure 3:
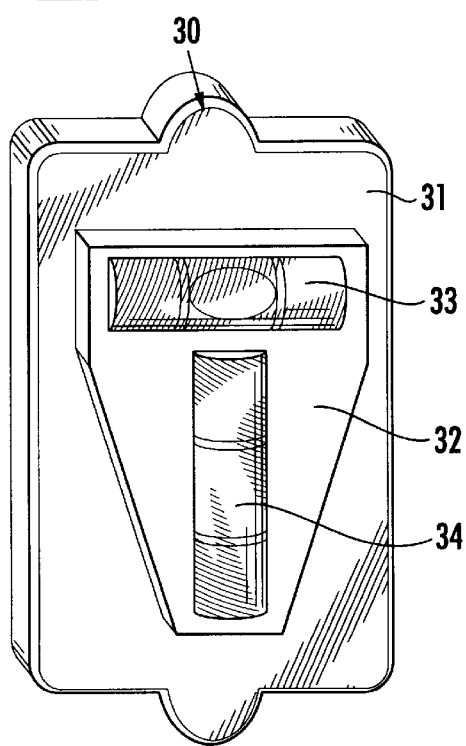
Figure 4:
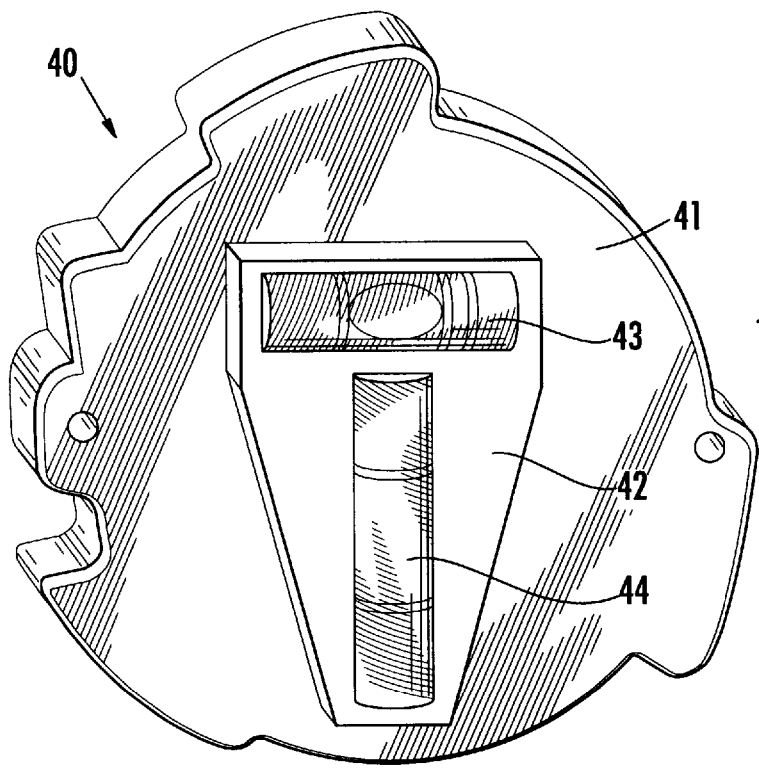
Figure 5:
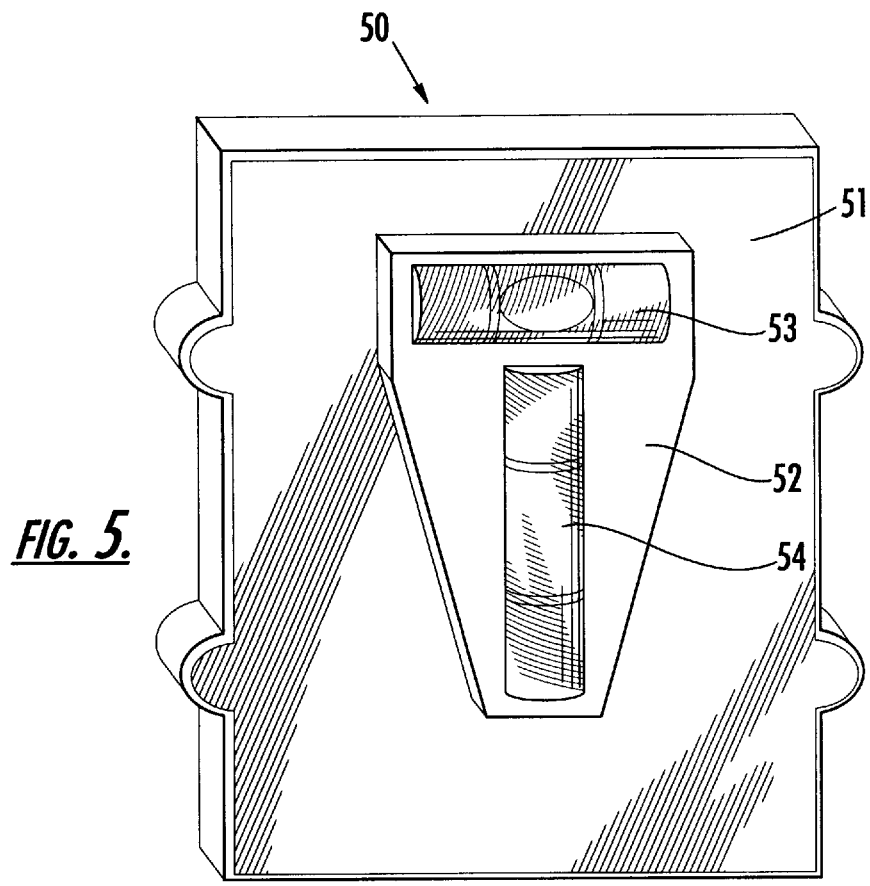
Figure 6:
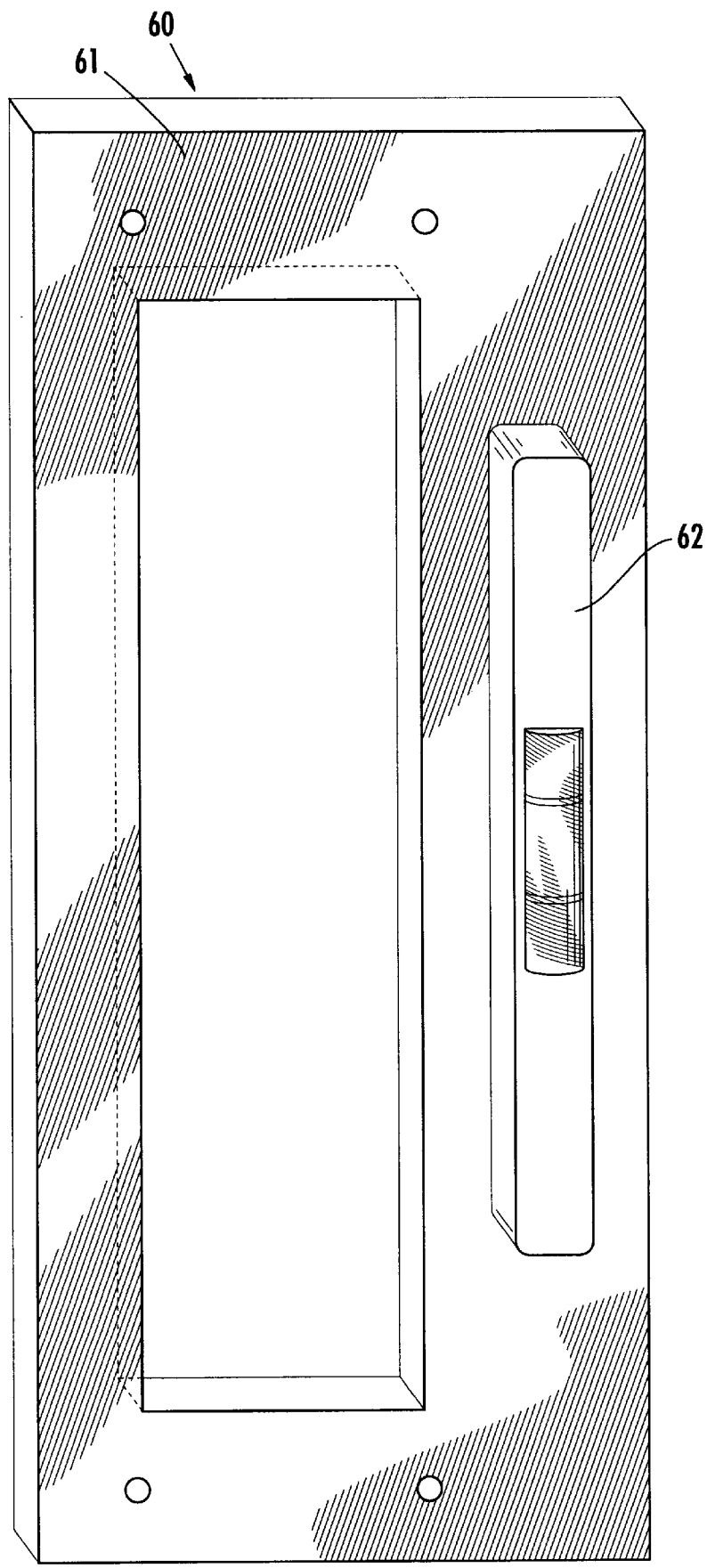

Referring now specifically to the drawings, templates according to the present invention are illustrated in FIGS. 1–6 and shown generally at reference numerals 10,20,30,40, 50, and 60, respectively. The templates 10–60 are formed of transparent acrylic plates 11, 21, 31, 41, 51, and 61, respectively, and are approximately ¼ inch thick. Templates 10–60 are formed by cutting the correct shape out of acrylic plate stock of desired thickness. In each case the templates are shaped to the exact peripheral shape of a corresponding utility box. In the embodiments shown in FIGS. 1–6, respective bubble-type spirit levels 12, 22, 32, 42, 52 and 62 are attached by, for example, epoxy adhesive, to one face of the acrylic plates 11, 21, 31, 41, 51, and 61. The levels 12, 22, 32, 42 and 52 are a type wherein two liquid-filled level tubes 13, 14; 23, 24; 33, 34; 43, 44; and 53, 54, respectively, are positioned at right-angles to each other and permit the template to be leveled whether the utility box is to be mounted upright or on its side.

The level 62 has only a single liquid-filled level tube 63. Since it is used with the 19 mail slot template 60 (FIG. 6) it is not likely be mounted in an upright position.

Figure 7:
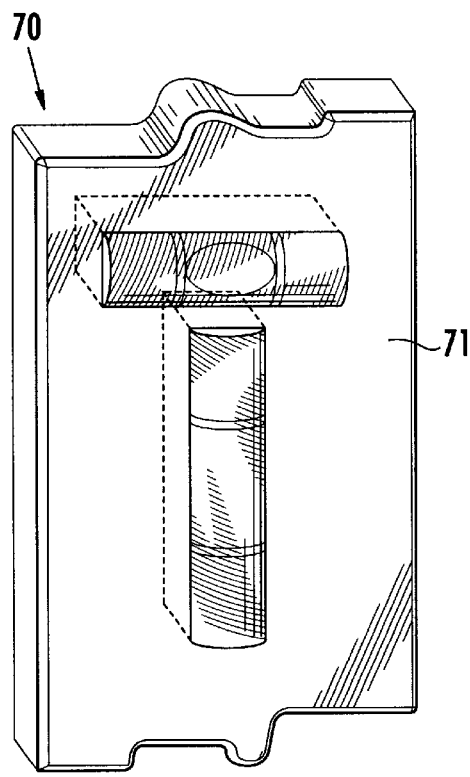
FIG. 7 is a perspective view of an alternative embodiment with the spirit levels embedded in the base.

Referring now to FIG. 7, a template 70 according to the invention can be molded by pouring liquid acrylic molding compound into a suitably shaped mold, thereby forming the body of the template 70. With such a construction, two liquid-filled bubble tubes 72, 73 can be placed into the mold, and the molding liquid poured over the level, embedding the tubes 72, 73 in the mold. This alternative is preferable, since the template 70 is therefore more compact and less subject to breakage or damage.

Figures 8, 9:
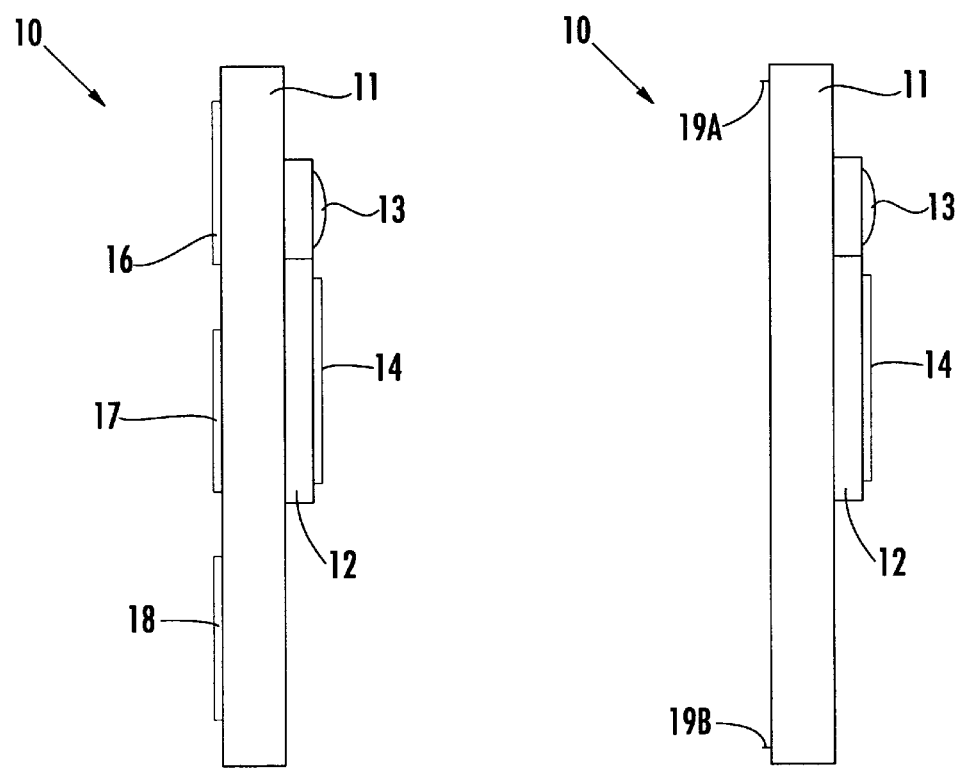
FIGS. 8 and 9 illustrate alternative embodiments of the gripping means for holding the template stationarily against the wall.

Any of the templates of the invention, including template 10 as shown in FIG. 8, may be equipped with double-sided tape, one or more rubber grippers 16, 17, and 18 to keep the template 10 from slipping on the wall while it is being held in place.

Alternatively, any of the templates of the invention, including template 10 as shown in FIG. 9, may be equipped with short pins 19A, 19B projecting outwardly from the back surface to slightly penetrate the dry wall to keep the template 10 from slipping while it is being held in place.

All of the templates of the invention are used in the same manner. As is shown in FIGS. 10–13, template 10 is held in the correct position on the wall "W" with one hand and oriented until the bubble in the tube 13 of the level 12 indicates that the template 10 is level. See FIG. 10. Then, the shape of the template 10 is traced onto the wall with the other hand, as is shown in FIG. 11.

As is shown in FIG. 12, the template 10 is removed and the opening is cut to the shape of the tracing. A utility box "B" of suitable size and shape is then fitted into the opening and attached to the wall, adjacent to the wall stud or otherwise, as shown in FIG. 13.

A template for insuring that utility boxes are properly in a wall, such as drywall, floor, ceiling or door, and that the utility box is level is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A template for permitting accurate and level marking of the shape of a wall opening for placement therein of utility boxes, comprising:
    (a) a base having a periphery shaped to match the shape of the periphery of a utility box to be fitted into the wall opening the base including opposed first and second surfaces, said first surface adapted for being engaged with the wall to be marked;
    (b) at least one spirit level cooperating with said base for permitting a user to level the template before marking the shape of the wall opening on the wall prior to forming the opening;
    (c) gripping means positioned on the first surface of the base for aiding in maintaining the base in a stationary position during marking of the wall; and
    (d) wherein said gripping means comprises a plurality of pins extending outwardly from the first surface of the base for penetrating the wall.

2. A template according to claim 1, wherein said spirit level is mounted on the second surface of said base.

3. A template according to claim 1, wherein said base is transparent.

4. A template according to claim 1, wherein said spirit level extends outwardly from the second surface of the base.

5. A template according to claim 1, wherein said spirit level is embedded in said base.

6. A template according to claim 1, wherein said at least one spirit level comprises first and second spirit levels, said first and second spirit levels being positioned at right angles to each other for permitting use of a predetermined one of said first or second spirit levels dependent on the orientation of the opening to be formed for the utility box.

7. A template according to claim 6, wherein said first and second spirit levels are secured to the second surface of the base.

8. A template for permitting accurate and level marking of the shape of a wall opening for placement therein of utility boxes, comprising:
    (a) a base having a periphery shaped to match the shape of the periphery of a utility box to be fitted into the wall opening the base, said base including opposed first and second surfaces, said first surface adapted for being engaged with the wall to be marked;
    (b) first and second spirit levels carried at right angles to each other on the base for permitting a user to level the template before marking the shape of the wall opening on the wall prior to forming the opening
    (c) gripping means positioned on the first surface of the base for aiding in maintaining the base in a stationary position during marking of the wall; and
    (d) wherein said gripping means comprises a plurality of pins extending outwardly from the first surface of the base for penetrating the wall.

9. A template according to claim 8, wherein said base is formed of transparent acrylic material.

10. A template according to claim 9, wherein said base is approximately one-quarter inch thick.

11. A template according to claim 9, wherein said first and second spirit levels are protectively embedded in said acrylic material.

* * * * *